US006968215B2

(12) United States Patent  
Muramatsu (10) Patent No.: US 6,968,215 B2
(45) Date of Patent: Nov. 22, 2005

(54) PORTABLE COMMUNICATION TERMINAL DEVICE AND CHARACTER/PICTURE DISPLAY METHOD

(75) Inventor: Seiji Muramatsu, Saitama (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 09/956,642

(22) Filed: Sep. 19, 2001

(65) Prior Publication Data

US 2002/0072394 A1  Jun. 13, 2002

(51) Int. Cl.$^7$ ............................................... H04B 1/00
(52) U.S. Cl. .................. 455/566; 455/418; 455/550.1; 710/67
(58) Field of Search ............................... 455/566, 418, 455/90.3, 550.1, 575.3, 575.1; 345/157, 184, 345/167, 816, 169; 710/67

(56) References Cited

U.S. PATENT DOCUMENTS

| | | | |
|---|---|---|---|
| 5,818,437 A | 10/1998 | Grover et al. | |
| 5,953,541 A | 9/1999 | King et al. | |
| 6,011,554 A | 1/2000 | King et al. | |

FOREIGN PATENT DOCUMENTS

| | | |
|---|---|---|
| EP | 0 605 945 | 7/1994 |
| EP | 0 844 571 | 5/1998 |
| EP | 0 917 330 | 5/1999 |
| EP | 0 930 760 | 7/1999 |

OTHER PUBLICATIONS

S. Flower, V. Stanwick; "The GUI Style Guide"; p 113; London, 1995; XP-001152133.
Kurtenbach et al: "The Hotbox: Efficient Access to a Large Number of Menu-Items"; Conference on Human Factors in computing systems SIGCHI; Toronto, Canada; May 15-20, 1999, pp. 231-237.

Primary Examiner—Melur Ramakrishnaiah
(74) Attorney, Agent, or Firm—Frommer Lawrence & Haug LLP; William S. Frommer; Thomas F. Presson

(57) ABSTRACT

Disclosed is a portable communication terminal device and a method of displaying characters and picture for enabling every user to swiftly and correctly input desired characters or correct input characters. This is achieved by way of implementing the following: When the inventive portable communication terminal device has entered into a character inputting mode, of those functional operations including shifting of cursor in all directions on a display screen and another operation to effect selection, i.e., an entering operation, shifting of cursor in the vertical direction via a jog dial is provisionally allocated to the shifting of cursor on word (or phrase) candidate lists and also to the instruction for selecting the corresponding candidates. When the designated candidate lists are closed, shifting movement of the cursor in all directions and the entering operation are allocated to the character-inputting screen.

8 Claims, 7 Drawing Sheets

PORTABLE COMMUNICATION TERMINAL DEVICE AND CHARACTER/PICTURE DISPLAY METHOD

CROSS REFERENCE TO RELATED APPLICATIONS

The present document is based on Japanese Priority Document JP 2000-287401, filed in the Japanese Patent Office on Sep. 21, 2000, the entire contents of which being incorporated herein by reference.

BACKGROUND OF THE INVENTION

1. Field of the Invention

The present invention relates to a portable communication terminal device and a character/image display method for enabling input of characters by operations through predetermined keys or a dial.

2. Description of the Related Art

Along with further diversification of services rendered by business operators such as Internet providers, for example, not only for mutual telephone communication, but portable telephone devices are also utilized as data terminal devices for exchanging letter information typically represented by E-mail communication, and yet, users of such portable telephone devices have extraordinarily increased in recent years.

Under such circumstances, every user of portable telephone devices actually encounters such a problem how to efficiently perform key input operation via a compactly configured portable telephone device having a limited number of input keys (buttons) with such a limited area of display screen. Because of this, in any of conventional portable telephone devices, each key is allocated with a plurality of operating functions and characters which are respectively subject to switching per operating program and mode.

Nevertheless, introduction of the above-mentioned switching method obliges every user to perform more operating steps and shift more operating modes than that is normally required for a personal computer fitted with a full-scale keyboard. In other words, whenever utilizing such a conventional switching method, users are obliged to depress an identical input key for plural rounds until an objective character is eventually input. In order to deal with this problem, there is such a character input method based on a predictive conversion method described below.

The predictive conversion method is characterized by such a method which enables an operator to optionally select a target word by executing serial steps including an initial input of readable Japanese "kana" syllables followed by a step of detecting certain words starting with a pattern of a single or several "kana" syllables corresponding those already being input and a final step of displaying the detected words as the predictive candidates. According to the method, the operator can select the target word without inputting all the "kana" syllables to be converted. Further, after entering a certain word, by way of displaying a successive phrase candidate as the predictive candidate, the operator is enabled to input a certain sentence merely by way of selecting a phrase candidate within such a scope in which phrase candidates can be combined with each other, even when the operator does not input any "kana" syllables at all.

As mentioned earlier, due to critical consideration on portable convenience with compact size and light-weight, any of conventional portable telephone devices is provided with a small display area and a limited number of input keys without being able to execute direct pointing via pen-touch, and as a result, it is quite difficult for any user to efficiently perform input of those words requiring conversion of "kana" syllables into corresponding Chinese characters. In particular, the above-referred existing method for allocating each of input buttons with a plurality of functions and characters in combination with each other by way of obliging every user to continuously depress a specific input button has already been accustomed and substantially standardized by a large number of existing users. Because of this, introduction of a new input method largely deviant from the existing method will cause users to be confused to consequently raise a problem.

On the other hand, even though the above referred predictive conversion method provides such an advantage in that highly compatible phrase candidates can be listed up at real time without performing a trigger input, that is, any "kana" input, this method still raises a problem in that user can hardly control the timing to list up the phrase candidates, and instead, list of the phrase candidates is displayed regardless of the user's intention.

Further, according to the predictive conversion method, there are two fields including the one used for inputting characters and the other one for listing up words and/or phrase candidates. In such a portable telephone device incapable of performing direct positioning, such a cursor for designating the actual input/selected position is required for each field. However, if there is merely a single operating device for shifting the cursor, it is not certain for any user to identify which cursor should be shifted at a specific timing while operating the device, thus raising a problem.

Further, while executing the predictive conversion method, independently of user's will (trigger), a list of convertible candidates and the phrase candidates to follow a character is displayed. For example, two kinds of scenes may be generated simultaneously including the one in which character cursor should be shifted in the upward and downward directions and the other one in which a cursor should be shifted in the upward and downward directions even in a case in which convertible candidates are displayed on the display screen. As a result, if there is merely a single operating device for shifting cursor in the upward and downward directions, it is required to dividedly allocate cursor to deal with both scenes, thus raising another annoying problem.

SUMMARY OF THE INVENTION

The present invention has been consummated to fully solve the above problems. The present invention provides a novel portable communication device and a novel method of displaying an image screen for enabling an operator to swiftly and securely input or correct characters without switching display screen even when there is merely a single operating device for shifting cursor.

The present invention also provides a novel portable communication terminal device and a novel method of displaying an image screen for freeing every user from erroneously operating the operating device by way of precisely coordinating the relationship between the direction of shifting cursor on the display screen and function of the operating device on the portable communication terminal device.

Such a novel portable communication terminal device is achieved by the present invention providing a portable communication terminal device which has a first cursor shifting device for shifting a cursor in a first direction on a display screen; a second cursor shifting device for shifting the cursor in a second direction on the display screen, wherein an editing object designated by the cursor on the display screen is selected via a specific operation performed through the first cursor shifting device; wherein, during a character input mode, the portable communication terminal device comprises: display means for displaying a predetermined candidate list on the display screen in response to the input of "kana" characters; first allocating means for allocating the first cursor shifting device to execute such operations required for shifting the cursor and selecting the editing object on the candidate list; and second allocating means for allocating the second cursor shifting device for shifting the cursor in the character input screen on the display screen.

The inventive portable communication terminal device functions itself in order to shift the cursor and select the editing object without switching display screen by applying such means for allocating the first cursor shifting device to execute an operation for shifting the cursor and selecting the editing object on the candidate list as well as for allocating the second cursor shifting device to execute an operation for shifting the cursor in the character input screen on the display screen.

Preferably, the inventive portable communication terminal device further comprises such switching means for switching the allocation of the first cursor shifting device and the second cursor shifting device to shifting the cursor and selecting the editing object specified by the shifted cursor in the character input display screen when the display screen is changed to display only the character input picture screen. Because of this arrangement, whenever the mode of the display screen returns back to the mode displaying the normal character input display screen, it is possible for the inventive portable communication device to shift the cursor in all directions and select the editing object on the display screen.

Further, the present invention further provides such a novel method of displaying an image screen in a novel portable communication terminal device incorporating a first cursor shifting device for shifting a cursor in a first direction in the display screen and a second cursor shifting device for shifting the cursor in a second direction whereby enabling itself to select an editing object specified by the cursor on the display screen via a predetermined operation performed through the first cursor shifting device; wherein, while the portable communication terminal device remains in a character input mode, the method comprising: a step of displaying a predetermined candidate list on the display screen; a step of displaying character input screen on the display screen; a first allocating step for allocating the first cursor shifting device to execute such operations for shifting the cursor and selecting the editing object on the candidate list; a second allocating step for allocating the second cursor shifting device for shifting the cursor in the character input screen; and a step for displaying the cursor at specific positions of the candidate list and the character input screen in accordance with allocations assigned via the first and second allocating steps.

As mentioned above, in accordance with allocations assigned by the first and second allocating steps, cursor is displayed at specific positions on the candidate list and the character input screen, and thus, operations for shifting the cursor and selecting the editing object can visually be clarified.

Preferably, the above-referred invention further comprises such a switching step for switching the allocation of the first cursor shifting device and the second cursor shifting device to shifting cursor and selecting an editing object in the character input screen. Because of this, it is visually clear that, whenever the display screen returns back to display the normal character input screen, operations for shifting the cursor and selecting the editing object can be performed in all directions on the display screen.

According to the present invention, the novel portable communication terminal device enables every user to swiftly and correctly input desired characters, correct input characters, and select proper words and phrases without necessarily executing switching between the character input screen and the word (phrase) candidate list screen by way of utilizing devices of the existing portable telephone devices.

Further, according to the present invention, when the normal character-input screen is resumed, the user is enabled to shift the cursor in all directions and execute an operation to properly select (enter) desired characters and phrases on the resumed character input screen.

According to another aspect of the present invention, the method for operating the inventive portable communication terminal device facilitates user to easily and visually recognize actual condition of the shift of the cursor and the operation for selecting desired words or phrases without necessarily performing switching of display screens.

According to a still further aspect of the present invention, when the display screen is brought back to the normal character-input screen, it is possible for the user to visually understand that cursor can be shifted in all directions and desired words or phrases can easily be selected on the display screen.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
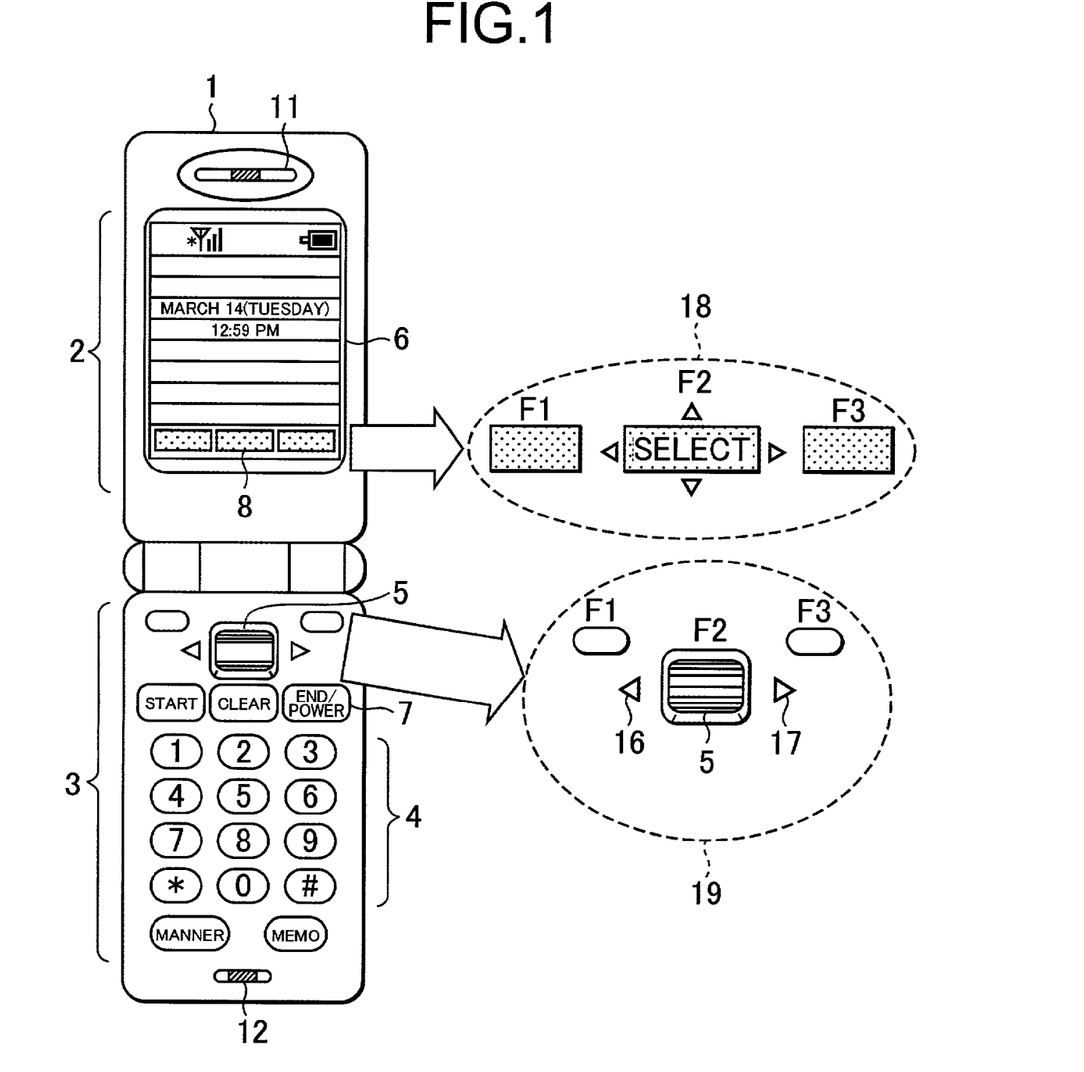
FIG. 1 presents an example of an external view of a novel portable communication terminal device according to an embodiment of the present invention.

Referring now to the accompanying drawings, practical forms for implementing the present invention are described below. FIG. 1 designates an example of an external view of the portable communication terminal device according to an embodiment of the present invention. Generally, the inventive portable telephone device 1 shown in FIG. 1 roughly comprises a display unit 2 and an input unit 3. The display unit 2 is composed of an LCD display unit 6 for visibly displaying specific character data and image data. The input unit 3 comprises numerical (ten) keys 4 used for the dial-input operation performed at the transmitting time as well as for registering a variety of data, a jog dial (center jog) 5, and other functional input buttons.

A speaker unit 11 and a microphone unit 12 are used for audio (voice) communication, which individually have a speaker (not shown) and a microphone (not shown) built-in. A plurality of soft keys 8 (which will be described later on) are disposed below the LCD display unit 6, which are instrumental to improve operating efficiency whenever a user inputs characters.

Those portions 18 and 19 surrounded by dotted lines shown in FIG. 1 respectively designate expanded periphery of the soft keys 8 and the center jog 5. Those soft-keys F1, F2, and F3 in the dotted line 18 individually correspond to another key F1, the center jog 5 (F2), and another key F3 in the dotted line 19, which are respectively disposed at an upper portion of the input unit 3 of the portable telephone device 1. This in turn means that an operation of depressing the center jog 5 activates input of instruction to the soft-key F2, in other words, selection, for example. Four of triangular marks disposed in the periphery of the soft-key F2 individually designate movable directions of a cursor when a corresponding image screen is displayed.

Figure 2:
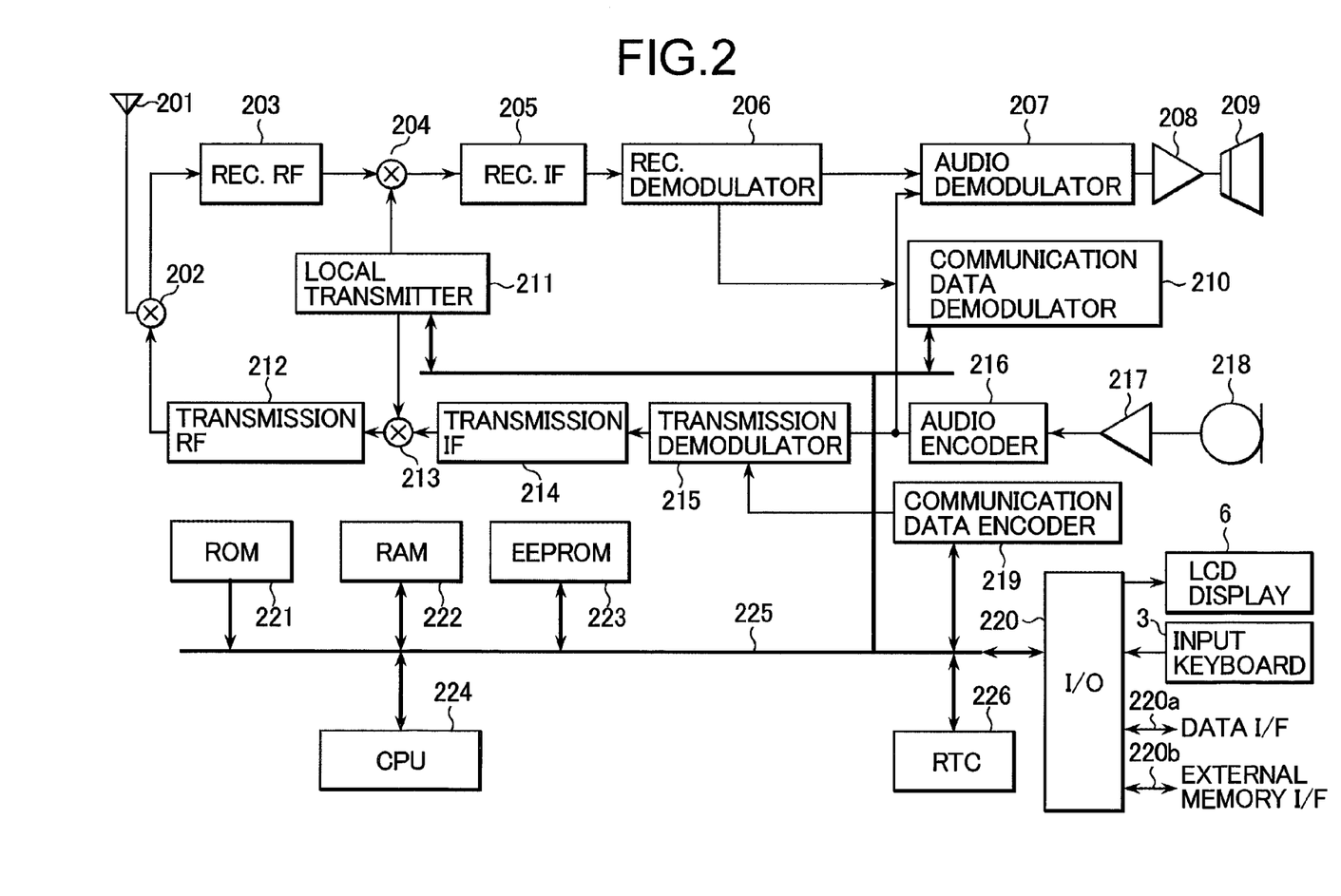
FIG. 2 presents a simplified block diagram of an internal structure of the novel portable communication terminal device according to the embodiment of the present invention.

FIG. 2 presents a simplified block diagram for designating internal construction of the portable telephone device (such as a digital cellular portable telephone device) according to the embodiment of the present invention. Referring to FIG. 2, a signal received by an antenna 201 is transmitted to a RF receiving unit 203 via a selector 202. In order that the received signal can maintain a proper level, the RF receiving unit 203 limits frequency band of the received signal and also treats it with an automatic gain controlling process as required. Next, frequency-controlled signal output from a frequency-controlled local transmitter 211 and another signal output from the RF receiving unit 203 are mixed together by a mixer 204 before eventually converting the received frequency into a constant frequency.

A signal output from a mixer 204 is then transmitted to an IF receiving unit 205, which then converts the input analog signal into a digital signal, and then, it eventually becomes such an IQ digital data incorporating a constant bit rate. The IQ digital data executes a variety of operations in a received-signal demodulator 206 such as elimination of adverse influence from the phasing process, discernment of the kinds of received signal, a de-interleaving process, and an error correction or the like, for example. After properly being demodulated, the IQ digital data is split into audio data and communication data.

Normally, the audio data is compressed, and then, the compressed audio data is transmitted on the block basis per received burst. Because of this, the compressed audio data is expanded by an audio decoder 207 and then decoded. The decoded audio data is then treated with a D/A (digital to analog) conversion process in accordance with an audio sampling rate. The D/A-converted analog vocal signal is power-amplified by a speaker amplifier 208 before eventually being output from a speaker 209.

On the other hand, communication data split via the received-signal demodulator 206 is eventually restored into original data by a communication data decoder 210. The received data is routed to a CPU bus 225, and then, transmitted to an external device from an input/output (I/O) unit 220 via a data interface (I/F) 220a.

On the part of the transmitter, voice of the user of the terminal device is converted into an analog audio signal via a microphone 218. Inasmuch as the analog audio signal output from the microphone 218 merely contains a negligible signal level, a microphone amplifier 217 amplifies the analog audio signal up to an essential voltage. Next, the amplified analog audio signal is converted into a digital signal based on a proper sampling rate by an audio encoder 216. Next, the digital audio signal is encoded, and then, compressed before eventually being arranged into a proper block compatible with a burst signal in the RF receiving unit 203.

Next, the digital audio signal transmitted from the data interface (I/F) 220a of the input/output (I/O) unit 220 is then arranged into a proper block in a communication data encoder 219. On the other hand, the data transmitted from the audio encoder 216 and the communication data encoder 219 are combined with each other by a transmitted-signal modulator 215 before eventually becoming such an IQ digital signal containing a constant data rate.

The IQ digital signal is then converted into an analog audio signal at an IF transmitting unit 214 and then converted into an analog-modulated signal. The analog-modulated signal is then mixed with a conversion signal transmitted from the local transmitter 211 by a mixer 213 whereby the mixed signal is converted into such a frequency desired for transmission. Next, in order to provide the mixed signal having a desired transmission frequency with specific power required for transmission, the mixed signal is then power-amplified by an RF transmitting unit 212 before eventually being output from the antenna 201 via the selector 202.

The CPU bus 225 is linked with a CPU 224 and a ROM (Read Only Memory) 221 which stores such a program executed by the CPU 224 and such data including display fonts. A RAM 222 is utilized for storing computable data as required while the CPU 224 keeps on executing a program and also for provisionally storing transferable data while shifting data between the receiver and the transmitter.

An EEPROM 223 consists of an electrically erasable memory, which provides every user with such utility by way of performing such functions including the following: Even when a user turns power off from the portable telephone device, the EEPROM 223 still memorizes actual setting condition immediately before the power is turned off. When the user turns power on again, in order to resume the setting condition identical to that was set before turning power off, the EEPROM 223 still memorizes the relevant setting parameter. In addition, the EEPROM 223 also stores a variety of word-candidates and phrase-candidates to be displayed on the LCD display 6 when the user inputs characters. A real-time clock (RTC) 226 provides data with regard to date, that is, the year, month, day, and time data, which is utilized for stamping time, display of time, and activation of alarm in the portable telephone device, for example.

The above-referred input/output (I/O) unit 220 functions itself as an interface between the CPU 224 and those components including the LCD display 6, the input keyboard 3, the data interface 220a, and an external memory interface 220b. The external memory interface 220b is utilized for storing a variety of data in such a case in which the inventive portable telephone device utilizes specific data fed from the "Memory Stick" (a product and a registered trade name of Sony Corporation) or in such a case in which data distributed from a service provider is down-loaded via an internet service network, for example.

Figure 3:
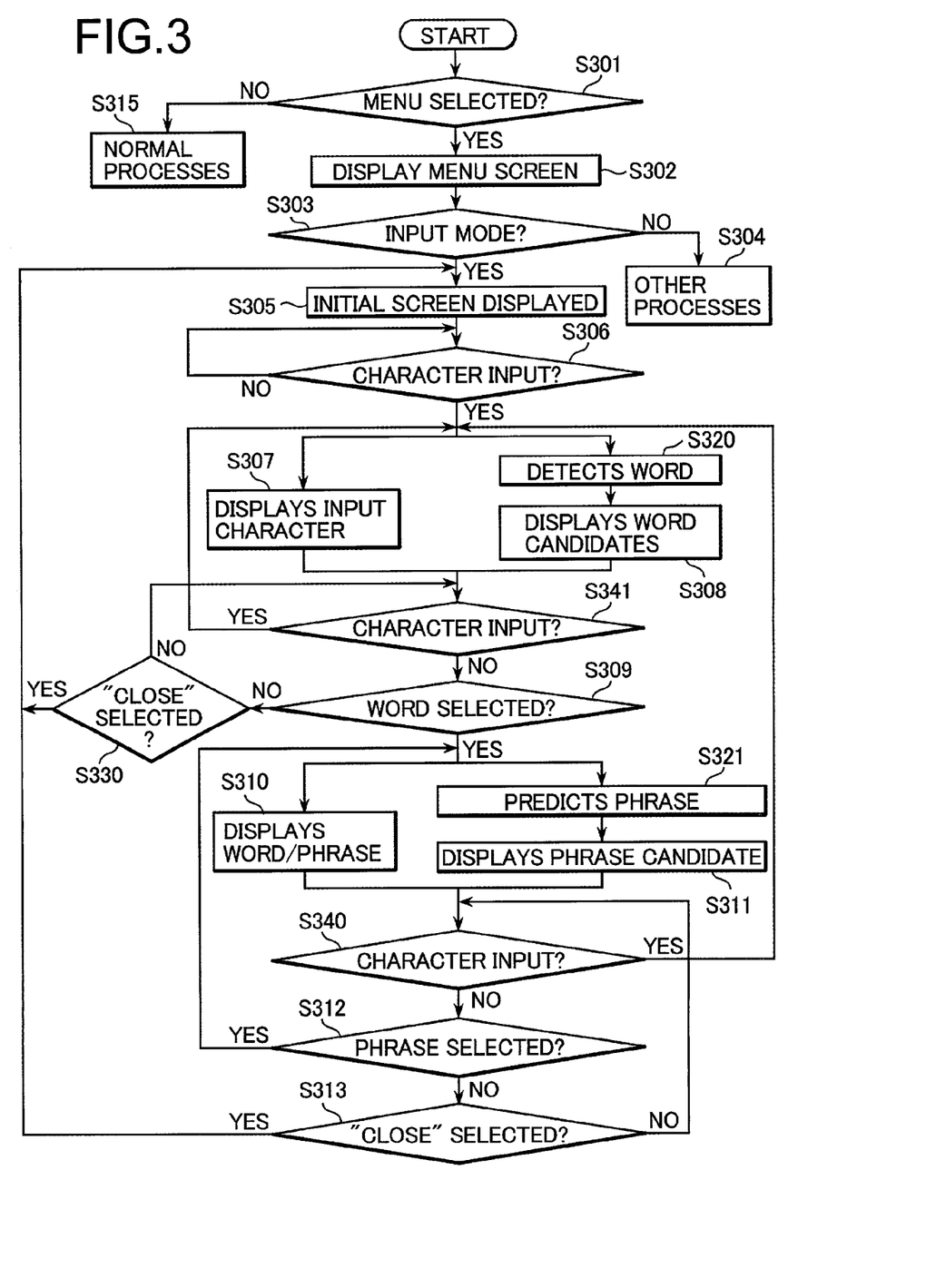
FIG. 3 presents a flowchart for designating serial steps for the input of characters when utilizing the novel portable communication terminal device according to the embodiment of the present invention.
Figure 4:
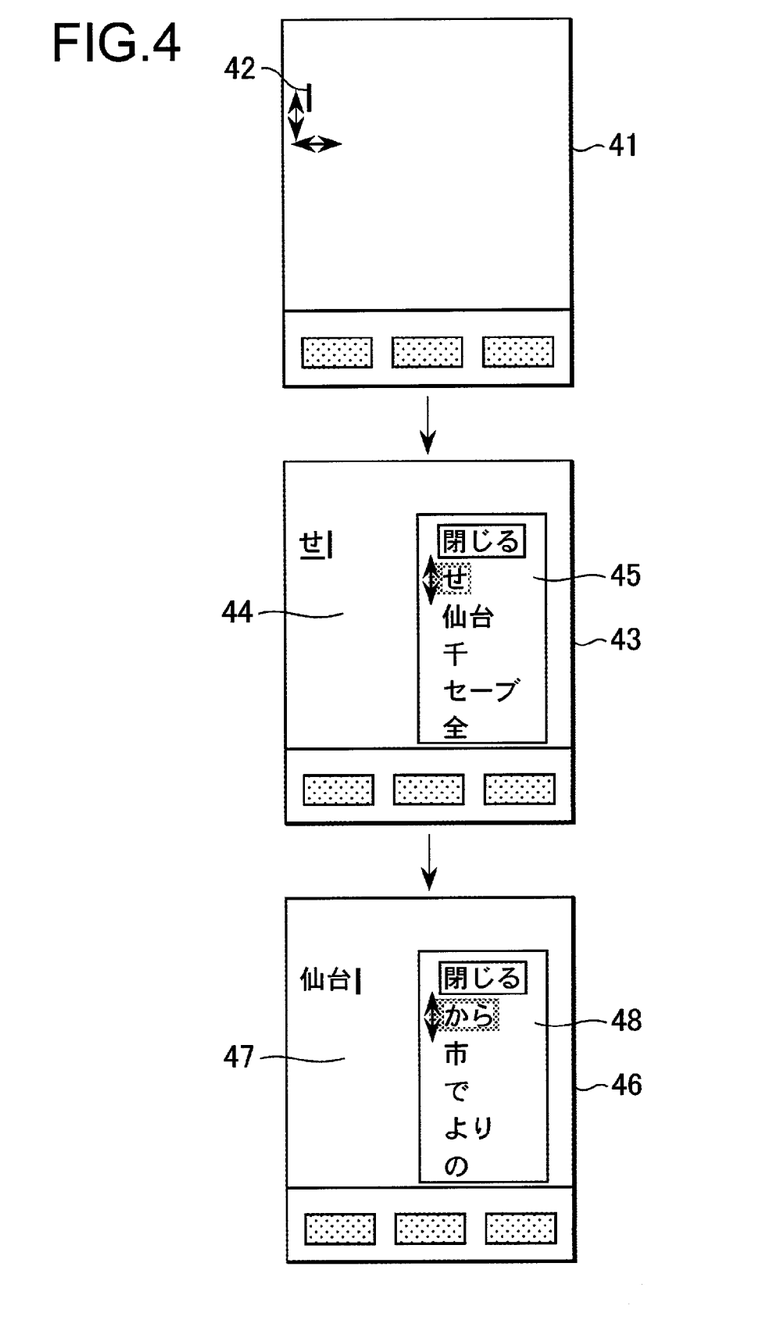
FIG. 4 presents concrete examples of a display screen of the portable communication terminal device in response to the character input operation.

Next, referring to the flowchart shown in FIG. 3, serial steps specified for the input of characters and corresponding screen display in the course of utilizing the novel portable telephone device according to the embodiment of the present invention are described below. FIG. 4 exemplifies concrete examples of screen display on the inventive portable telephone device in correspondence with serial steps for the input of characters.

Normally, in order to specify an editing point in the character input screen, it is required to shift a cursor. Because of this, shift of the cursor in the vertical and horizontal directions is instructed by way of operating specific input buttons aligned in the vertical and horizontal directions, a jog dial, or via combined operation of the jog dial and horizontally disposed input buttons, or via combined operation of the vertically operable lever and horizontally disposed input buttons, which are respectively provided on the portable telephone device. Further, in order to express user's will to decide for the input including the will to set up or select a specific item, user executes an operation to depress the jog dial 5, for example.

When utilizing the novel portable telephone device according to the embodiment of the present invention, in order to execute five-directional instructions for instructing vertical and horizontal shift of cursor and a depressing operation (in other words, enter) the jog dial 5, the jog dial 5 shown in FIG. 1 is operated for vertical shift of the cursor and depressing; a left key 16 is depressed for a leftward shift of the cursor; and a right key 17 is depressed for a right ward shift of the cursor. Generally, the shift of cursor in the horizontal direction for the input of characters is utilized for changing a conversion width (unit) or for the switching of conversion objects in the course of converting serial paragraphs.

Referring now to the flowchart shown in FIG. 3, serial steps for inputting characters into the inventive portable telephone device are described below. Initially, while the inventive portable telephone device 1 remains in the "stand-by" mode, when the user selects a menu to call up the menu screen by way of executing a predetermined operation, that is, "Yes" in step S301, for example, in the flowchart, the CPU 224 executes such an operation to cause a predetermined menu screen to be shown on the LCD display 6 in the ensuing step S302.

If no menu is selected in the step S301, the process goes to step S315, in which normal processes including continuous display of the "stand-by" screen, generation of ringing tone in response to a received call or a literal message, and display of the record on the reception and transmission of the call or the literal message on the LCD display, are individually executed.

In step S303, it is determined whether the user has actually selected a specific mode related to the input of characters out from a plurality of designated menus or not. For example, when the user has selected such a memo-pad mode for newly preparing a mail document or the like by opening a corresponding menu, such an image screen 41 shown in FIG. 4 is displayed. If the user does not select such an input mode, the process goes to another flow, that is, step S304. If the input mode has been selected, the process goes to step S305, in which an initial screen display corresponding to the input mode is displayed. As shown via the image screen 41 shown in FIG. 4, for example, a cursor 42 (depicted by a vertical line in the figure) is displayed at an upper-left corner of the LCD display screen in the initial screen display. This designates that the inventive portable telephone device awaits input of characters to be executed by the user.

As the initial screen display, there may be such a case in which "browsing" image screen is displayed. Availing of this, the user will be able to correct the already input characters. Further, in the image screen 41 shown in FIG. 4, as shown via arrow symbols, the cursor 42 can be shifted in all four directions including upward, downward, rightward and leftward directions, and thus, as will be described later on, such an operation to decide for the input of characters by way of depressing the jog dial 5 can be effectuated in this image display.

In step S306, if the user inputs a Japanese "hiragana" character "せ (se)" by operating one of the numerical keys 4, for example, the CPU 224 displays the input character on the LCD display 6 in the ensuing step S307. Along with the display operation, the CPU 224 starts to detect a certain word that can correspond to the input a Japanese "hiragana" character "せ (se)", in other words, a ward starting with the character "せ (se)" in step S320. In the ensuing step S308, the CPU 224 enables display of a list designating practical word-candidates to be described later on.

Display of word-candidates designates such function to display such a word begun with the initial one character or plural characters previously being input via key operation out from a plurality of words previously registered in a dictionary as practical word candidates potentially desired by users. Accordingly, in the above example, as shown in a word-candidates list 45 displayed in a display screen 43 shown in FIG. 4, a plurality of word-candidates beginning with a Japanese "hiragana" character "せ (se)" or "katakana" character "セ (se)" are individually displayed.

According to an example shown in the display screen 43 shown in FIG. 4, when a specific character is input, the word-candidates list 45 for designating practical word-candidates pops up for display as a provisional screen display. At the same time, among such an operation performed for shifting the cursor in the vertical and horizontal directions and such an operation to decide for the input of a specific character allocated to an input field 44, while preserving such a state in which only the cursor-shifting device comprising the left-key 16 and the right-key 17 provided on the portable telephone device compatible with shifting movement in the horizontal direction is allocated to the input field 44, such an operation for shifting cursor in the vertical direction by applying the jog dial 5 and another operation for depressing (entering) the jog dial 5 are divided into the shifting of the cursor on the word-candidates list 45 and the instruction for selecting a specific word candidate pointed out by the cursor.

In step S341, the CPU 224 identifies whether any character has already been input in succession to the previously input character or not. If it is identified that a new character has been input, operating mode is back to steps S307 and S320 to cause the newly input character to be displayed on the LCD display 6 in succession to the one already been input. Simultaneously, the CPU 224 starts to detect a proper word.

If it is determined that no character has yet been input while proceeding with step S341, the process goes to step S309, in which the CPU 224 determines whether the user has actually performed such an operation to select a predetermined word out from the displayed word-candidates by way of shifting the cursor in the vertical direction by operating the jog dial 5 or not. For example, if the user has selected a proper word "仙台 (Sendai: a name of a city)", the CPU 224 causes the selected word "仙台 (Sendai)" to be displayed on the LCD display 6 in step S310 (refer to a display screen 46 shown in FIG. 4).

Simultaneously, in step S321, the CPU 224 predicts such a phrase required for detecting a proper word that may ensue the selected word. In the following step S311, the CPU 224 displays a phrase-candidates list 48 for designating probable phrase candidates (shown in FIG. 4) that may be linked with the selected word "仙台 (Sendai)" on the LCD display 6.

As was done for the above-referred word selection, even when the above-referred phrase predicting condition (display screen 46 shown in FIG. 4) is underway, devices for shifting the cursor in the horizontal direction including the left-key 16 and the right-key 17 are allocated to an input field 47. On the other hand, in order to execute an operation to shift the cursor in the vertical direction and an entering operation, the jog dial 5 is allocated to the phrase-candidates list 48.

If no word has been selected while proceeding with step S309, the process goes to step S330, in which the CPU 224 determines whether the user has actually selected a word "閉じる" (tojiru: corresponding to a verb "close") within the word-candidates list 45 by way of shifting the cursor in the vertical direction or not. If the word "閉 じる" (close) has already been selected, then, the operating mode is back to step S305, in which the CPU 224 executes a process to display a predetermined character, where only the already input character is displayed on the LCD display 6 without displaying the word-candidates to enable the user to solely observe the character input field.

Conversely, if the word "閉じる" (close) is not selected while proceeding with step S311, then, the process goes to step S341 to determine whether a new character has actually been input or not. This in turn corresponds to such a state in which the CPU 244 awaits input of the following character and also corresponds to such a process to be executed by the user when continuously inputting Japanese "kana" characters.

When phrase candidates are displayed in step S311, the process goes to the ensuing step S340, in which it is determined whether the user has actually input any character or not. If any character has actually been input, the operating mode is back to step S307 and step S320 to enable the CPU 224 to display the newly input character on the display screen in succession to the one already been input simultaneously with activation of the above-referred operation for detecting proper words.

On the other hand, if no character has been input while proceeding with step S340, the process goes to step S312, in which the CPU 224 determines whether the user has actually executed such an operation for selecting a proper phrase by way of shifting the cursor in the vertical direction by operating the jog dial 5 or not. If it is determined that the user has actually selected a proper phrase, the CPU 224 brings the operating mode back to step S310 and step S321. Concretely, in step S310, selected phrase is displayed. In other words, the selected phrase is displayed in succession to those characters or character strings already being decided for the input. In addition, in step S321, the CPU 224 executes the above-referred phrase prediction.

After displaying the selected phrase on the display screen, the operating mode proceeds to step S340 to wait for the input of a new character. On the other hand, if it is determined that no phrase has been selected while proceeding with step S312, then, the process goes to step S313, in which the CPU 224 determines whether the word "閉じる" (close) shown in the phrase-candidates list 48 has actually been selected (entered) or not. In consequence, if the word "閉じる" (close) has actually been selected, then, the process goes to step S305. Conversely, if the word "閉じる" (close) is not selected, the operating mode is again back to step S340 in order to have the CPU 224 determine whether input of a new character has actually been done by the user or not.

As mentioned above, only the device for shifting the cursor in the horizontal direction is allocated to the input fields 44 and 47 shown in FIG. 4. This is because, any user rarely performs such an operation to cause a selected word to deviate itself from the cursor position on the way of inputting it before firmly deciding it for the input. Because of this, it will be quite enough for the character input operation by way of shifting cursor solely in the horizontal direction.

Selection of the word "閉じる" (close) provided in the word candidate list 45 and the phrase-candidate list 48 by the user implies the following: Concretely, by way of selecting the word "閉じる" (close), the word-candidate list 45 and the phrase-candidate list 48 are respectively erased (that is, the display of the list is closed). This in turn enables the device for shifting the cursor in the vertical direction and the other entering device thus far being allocated to the list-displaying screen to be back to the input field as fast as possible.

As mentioned above, according to the embodiment of the present invention, whenever the inventive portable telephone device is activated into a character-input mode, among such an operation to execute shifting of the cursor in the vertical and horizontal directions and the entering operation on the display screen, execution of an operation to shift the cursor in the vertical direction and an entering operation via the jog dial are provisionally allocated to the instruction for shifting the cursor on the word-candidates list and the phrase-candidates list and the other instruction for selecting proper candidates. In order to shift the cursor in the horizontal direction, the left and right keys on the telephone device are utilized. Owing to the above arrangement, it is possible for the inventive portable telephone device to quickly and correctly execute various operations for the input and correction of desired characters as well as for selecting proper words and phrases without necessarily executing switching operation to switch between the character input field and the display screen for displaying a list of word or phrase candidates.

Further, it is possible for the inventive portable telephone device to access the character-input field and the list of the word and phrase candidates while solely proceeding with the character-input mode instead of introducing such a conventional concept which allocates the existing devices for shifting the cursor including a jog dial and left/right keys to the character-input field and the list of word and phrase candidates and executes a switching operation for switching fields for the sake of inputting character. Because of this accessibility, the inventive portable telephone device dispenses with provision of a new device otherwise required for switching fields. Accordingly, it is possible for the inventive portable telephone device to utilize input devices provided for the existing portable telephone devices as of the existing condition, thus making it possible to securely input characters at a faster timing without fail, and yet, without increase of cost.

Further, by virtue of such an arrangement in which the CPU 244 initially detects specific characters based on the input characters followed by a display of word-candidates corresponding to the detected characters, a process for predicting a proper phrase compatible with the displayed words, and a final step of displaying a list of probable phrase candidates, the user is saved from executing a variety of processes except for merely selecting a specific word or phrase cited in the candidate lists. In consequence, rounds of key input operation are drastically decreased to facilitate composition of a sentence with promoted easiness.

Figure 5:
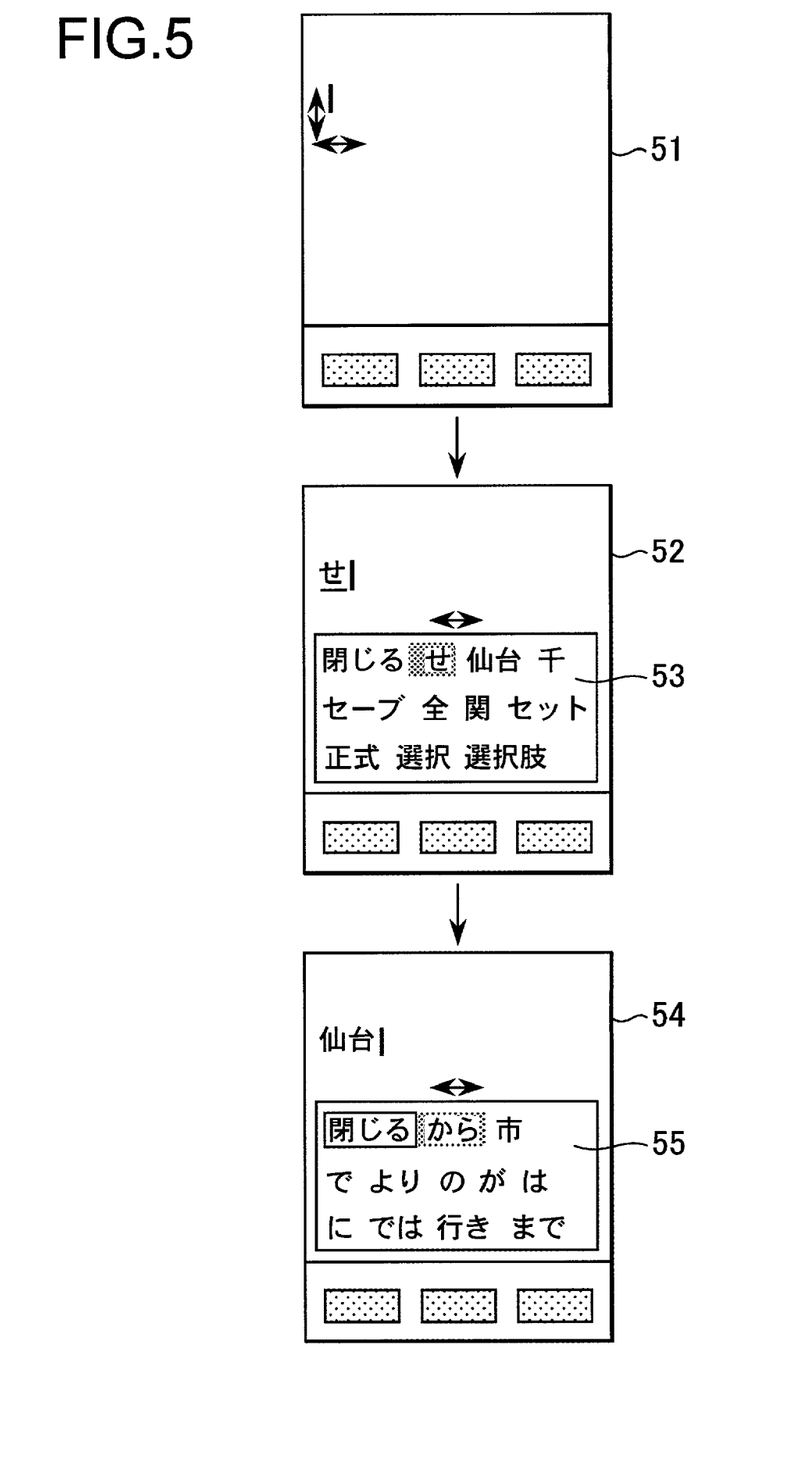
FIG. 5 presents other examples of the display screen in response to the character input operation.

It should be understood that the scope of the present invention is by no means confined to the embodiments described above, but a wide variety of modifications may also be implemented within such a scope that does not deviate from the essentials of the present invention. For example, arrangement of word-candidates and phrase-candidates cited in the word-candidates list and the phrase-candidates list is not solely limited to a format in a vertical direction (a single column) shown in FIG. 4, but as shown in FIG. 5, the above word-candidates and phrase-candidates may also be disposed in the horizontal direction for several lines. Concretely, a word-candidates list 53 and a phrase-candidates list 55 shown in FIG. 5 individually correspond to the above-referred lists 45 and 48 shown in FIG. 4.

By way of horizontally disposing the word candidates and the phrase candidates, it is possible to prevent part of the already input characters displayed on the input field from provisionally being concealed by the word-phrase candidate lists. Even in the case shown in FIG. 5, vertical-directional operation of the jog dial 5 and another operation for depressing the jog dial 5 are individually allocated to the shift of the cursor in the horizontal direction on the candidate lists 53 and 55 and an operation for entering the selected candidate.

Figure 6A:
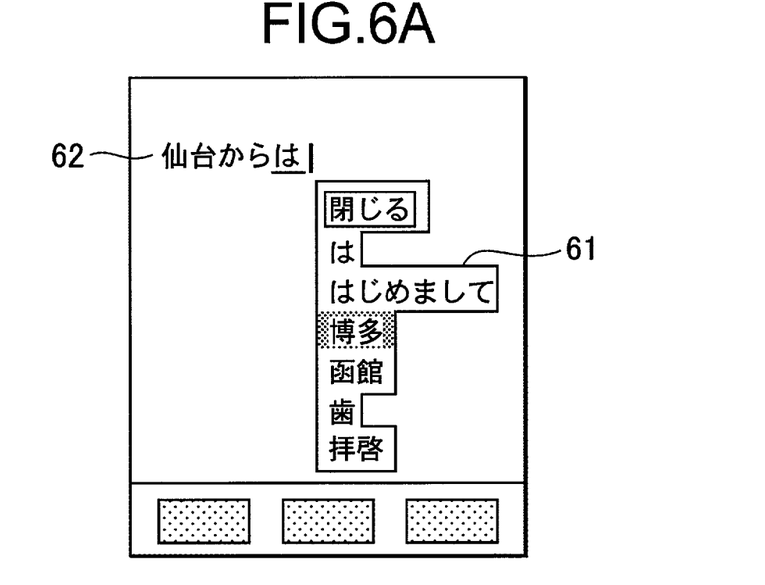
FIG. 6 presents the relationship between characters on a character input field and a word/phrase candidate list.
Figure 6B:
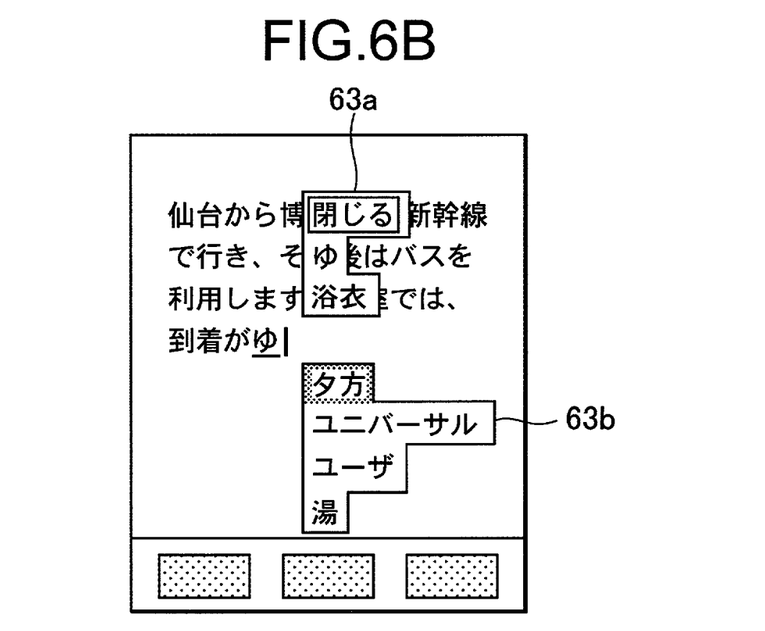

Further, as shown in FIG. 6A, as another practical method to prevent characters on the input field from being concealed by the word and phrase candidate lists, when inputting characters corresponding to the first line, a word-candidates list 61 is so arranged that the list will begin with such a position right behind an input Japanese "kana" character "は" (ha), and yet, the list will also begin with such a line right below a line 62. In regard to such lines below the second line, as shown in FIG. 6B, it is allowable to separately dispose a words-candidates list 63 displaying words-candidates other than those shown in the list 61 by way of dividing the list at the line on which a character is currently input.

By virtue of the above arrangement, visual discernment and utility of the display screen are significantly improved at least without causing the character-inputting line to be concealed by the word and phrase candidate lists.

Further, as shown in the display screen 43 shown in FIG. 4, it is also allowable to arrange the display system by way of the following: Initially, input characters and phrases are so arranged that each line will be broken at the left end of the word-candidates list 45 to start a new line, and then, at the moment at which the list display is turned off via user's selection of the word "閉じる" (close), these characters and phrases will be brought back to the normal display format by way of proceeding with the display of characters and phrases to the right from the upper left portion of the display screen and then each line is broken at the right end to start with a new line at the right end. When introducing this method, even in a case of continuously inputting a number of characters, there is no fear of causing the word candidate list 45 to adversely obstruct the input characters at all.

As a still further practical method, as shown in the display screen 43 shown in FIG. 4, initially, the input characters and phrases are vertically written within the input field 44 while the list is displayed. Then, simultaneous with the turn-off of the list display, these characters and phrases may be brought back to the normal display format with horizontal alignment of input characters and phrases. Even when introducing this method, it is possible to prevent the input characters from being concealed by the word and phrase candidate lists 45 and 48.

In the above embodiments of the present invention, it is supposed that the LCD display 6 utilizes monochromatic display of characters and phrases. However, by way of replacing the monochromatic display with a color LCD, it is also allowable to arrange display of soft-keys in coordination with the display of input characters, especially in regard to the display of the word and phrase candidate lists as will be described below.

Figure 7:
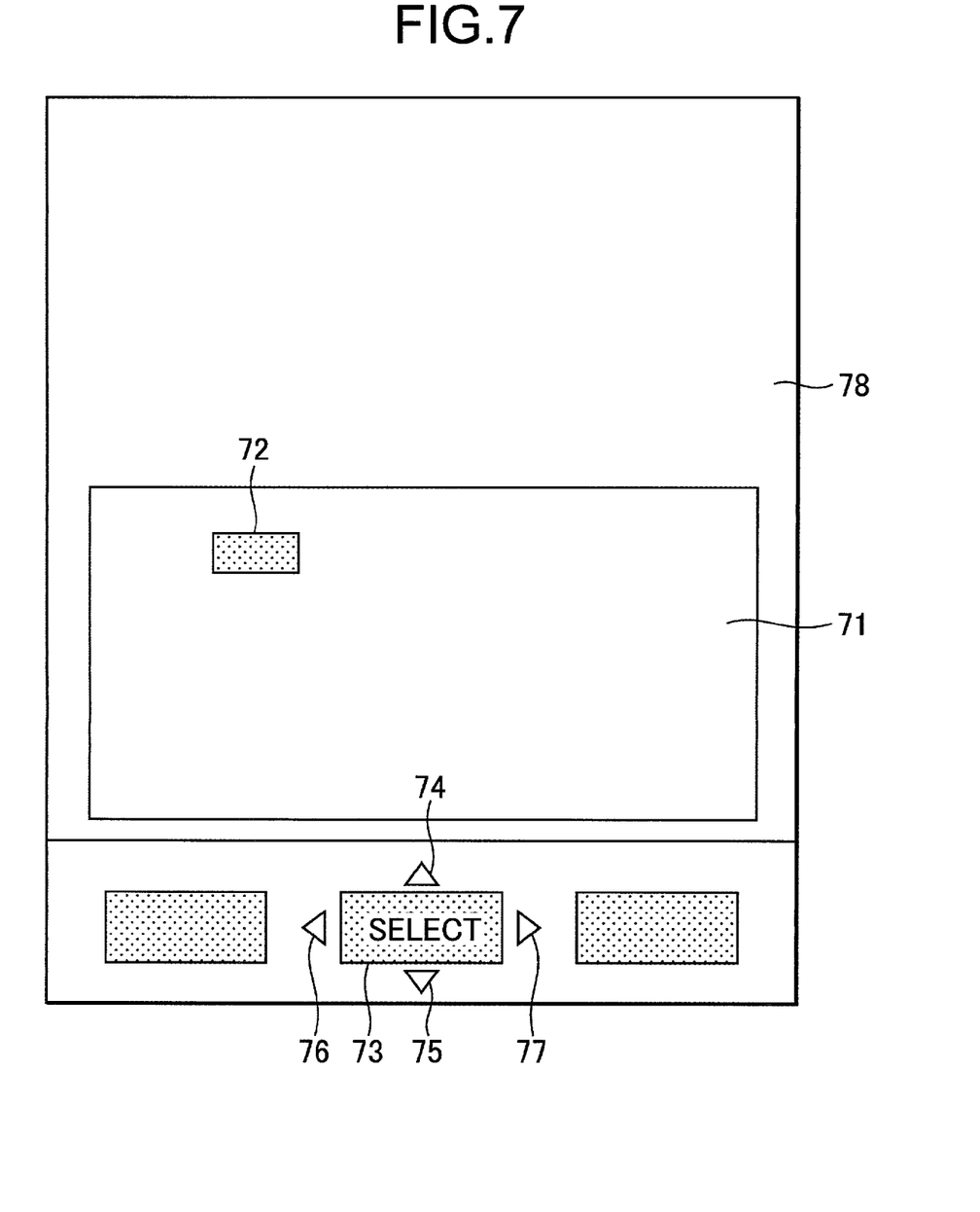
FIG. 7 presents a plan view of soft-key display and character input screen in a color liquid crystal display.

More particularly, when the inventive portable telephone device enters into the character inputting mode, as shown in FIG. 7, in order that an input field 78 can visually be discerned from a word-candidates list 71, display colors of the word-candidate list 71 and a cursor 72 are converted from black and white into greenish colors, for example. Simultaneously, the color of a certain character (for designating "selection" in this case) on a soft-key 73 corresponding to the jog dial 5 is changed from white in the bluish background color into green, for example. In addition, among four of triangular marks 74~77 designating movable directions of the cursor, only the color of the marks 74 and 75 is changed from white into green, for example.

Further, while the character inputting mode is underway, it is also possible to have users understand that the word-candidates list 71 and the soft key 73 are mutually related to each other by way of changing display colors of the word-candidates list 71, the soft-key 73, and the marks 74 and 75 into analogous colors.

Concretely, while the word-candidates list 71 is displayed, the user can recognize that, with the help of "green" color, an action of depressing the jog dial 5 corresponds to an action of "selection" shown on the soft-key 73. In summary, this is such a method to have users easily understand that shift of the cursor by way of operating the jog dial 5 is solely effective within the word-candidates list 71, in other words, the depressing action of the jog dial 5 is allocated to such an operation for shifting the cursor on the word-candidates list 71.

As mentioned above, by way of unifying display color of screen related to specific function and display color of the soft-key 73 into an analogous color, user is enabled to instantaneously and correctly recognize the corresponding relationship between the display screen and key operation, and thus, it is possible to significantly improve efficiency in the user's manual operation for inputting intended characters.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A portable communication terminal device comprising a first cursor shifting device for shifting a cursor in a first direction on a display screen and a second cursor shifting device for shifting the cursor in a second direction on said display screen; wherein an editing object specified by the cursor on said display screen is selected via a predetermined operation performed by said first cursor shifting device; wherein, during a mode of character input, said portable communication terminal device comprises:

display means for displaying a predetermined candidate list on said display screen in response to an input;

first allocating means for allocating said first cursor shifting device for shifting the cursor and selecting the editing object on said display screen;

second allocating means for allocating said second cursor shifting device for shifting the cursor in a character-input screen on said display screen; and switching means for effecting, when said display screen changes to display only said character-input screen, a switching operation in which said first cursor shifting device and said second cursor shifting device are allocated to shifting of the cursor and selecting the editing object specified by the cursor in the character input screen, wherein said switching operation is executed in linkage with an operation for closing said candidate list off from said display screen, and wherein such a command for closing said candidate list is displayed as one of choices in said candidate list.

2. The portable communication terminal device according to claim 1, wherein a direction of operating said first cursor shifting device is constantly coincident with a direction of shifting the cursor on said candidate list.

3. The portable communication terminal device according to claim 1, wherein a direction of operating said first cursor shifting device is deviant from a direction of shifting the cursor by 90 degrees on said candidate list.

4. A portable communication terminal device comprising a first cursor shifting device for shifting a cursor in a first direction on a display screen and a second cursor shifting device for shifting the cursor in a second direction on said display screen; wherein an editing object specified by the cursor on said display screen is selected via a predetermined operation performed by said first cursor shifting device; wherein, during a mode of character input, said portable communication terminal device comprises:

display means for displaying a predetermined candidate list on said display screen in response to an input;

first allocating means for allocating said first cursor shifting device for shifting the cursor and selecting the editing object on said display screen; and second allocating means for allocating said second cursor shifting device for shifting the cursor in a character-input screen on said display screen, wherein said candidate list includes a first list comprising a plurality of selectable word candidates and a second list comprising a plurality of selectable word and/or phrase candidates that can respectively be continued to a word selected from said word candidates in said first list, and wherein said plurality of word candidates and said plurality of word and/or phrase candidates are individually aligned in a vertical direction in said first list and said second list, respectively.

5. The portable communication terminal device according to claim 4, wherein said candidate list is so arranged as to avoid a character-input area on said display screen.

6. A portable communication terminal device comprising a first cursor shifting device for shifting a cursor in a first direction on a display screen and a second cursor shifting device for shifting the cursor in a second direction on said display screen; wherein an editing object specified by the cursor on said display screen is selected via a predetermined operation performed by said first cursor shifting device; wherein, during a mode of character input, said portable communication terminal device comprises:

display means for displaying a predetermined candidate list on said display screen in response to an input;

first allocating means for allocating said first cursor shifting device for shifting the cursor and selecting editing object on said display screen;

second allocating means for allocating said second cursor shifting device for shifting the cursor in a character-input screen on said display screen;

function display means for performing a functional display indicating a function of said first cursor shifting device on said display screen; and visibly display means for visibly displaying the functional display and said candidate list in an analogous color.

7. A method of displaying characters and images on a display screen of a portable communication terminal device which is provided with a first cursor shifting device for shifting a cursor in a first direction on a display screen and a second cursor shifting device for shifting the cursor in a second direction on said display screen and capable of selecting an editing object specified by the cursor on said display screen via a predetermined operation performed by said first cursor shifting device, wherein, while said portable communication terminal device remains in a character-inputting mode, said method comprises:

a step of displaying a predetermined candidate list on said display screen;

a step of displaying a character-input screen on said display screen;

a first allocation step for allocating said first cursor shifting device to execute an operation for shifting a cursor on said candidate list and another operation for selecting said editing object;

a second allocation step for allocating said second cursor shifting device to execute an operation to shift the cursor in said character-input screen; and a step of displaying the cursor at a predetermined position on said candidate list and on said character-input screen in accordance with allocation assigned via said first and second allocation steps;

a step of performing a functional display indicating a function of said first cursor shifting device on said display screen; and a step of visibly displaying functional display and said candidate list in an analogous color.

8. The method of displaying characters and images according to claim 7, wherein said candidate list is so arranged as to avoid a character-input area on said display screen.

* * * * *

UNITED STATES PATENT AND TRADEMARK OFFICE
CERTIFICATE OF CORRECTION

PATENT NO. : 6,968,215 B2  Page 1 of 1
DATED : November 22, 2005
INVENTOR(S) : Muramatsu It is certified that error appears in the above-identified patent and that said Letters Patent is hereby corrected as shown below:

Title page,
Insert Item:
-- [30]  Foreign Application Priority Data
   Sep. 21, 2000   (JP) ………………………... 2000-287401 --.

Signed and Sealed this

Thirty-first Day of January, 2006

JON W. DUDAS
*Director of the United States Patent and Trademark Office*